(12) United States Patent
Peddicord

(10) Patent No.: US 6,190,552 B1
(45) Date of Patent: Feb. 20, 2001

(54) SALT PLATFORM

(75) Inventor: Donald B. Peddicord, 2811 Misty Cr., Durant, OK (US) 74701

(73) Assignees: Donald B. Peddicord, Durant, OK (US); Steve M. Peddcord, Arlington, TX (US)

( * ) Notice: Under 35 U.S.C. 154(b), the term of this patent shall be extended for 0 days.

(21) Appl. No.: 09/027,641

(22) Filed: Feb. 23, 1998

Related U.S. Application Data

(60) Division of application No. 08/594,245, filed on Jan. 30, 1996, now Pat. No. 5,788,933, which is a continuation-in-part of application No. 08/450,896, filed on May 26, 1995, now Pat. No. 5,643,541, which is a continuation-in-part of application No. 08/432,728, filed on May 2, 1995, now abandoned.

(51) Int. Cl.$^7$ .............................. B01D 11/02; B01D 25/00
(52) U.S. Cl. ......................... 210/228; 210/229; 210/455; 422/261; D23/259
(58) Field of Search ................................. 210/224, 455, 210/190, 228, 229; 172/582; 422/266, 274–276, 261, 311; D23/209, 207, 259–261

(56) References Cited

U.S. PATENT DOCUMENTS

| | | | |
|---|---|---|---|
| D. 264,694 | 6/1982 | Takahashi | D11/131 |
| D. 278,110 | 3/1985 | Boland, II | D7/708 |
| D. 316,282 | 4/1991 | Winston | D21/486 |
| D. 363,971 | 11/1995 | Peddicord et al. | D23/207 |
| D. 376,837 | 12/1996 | Peddicord et al. | D23/207 |
| 945,989 | 1/1910 | Sponenbarger | 210/433.1 |
| 1,385,903 | 7/1921 | Cochran | 248/146 |
| 1,932,117 | 10/1933 | O'Brien et al. | 210/318 |
| 1,986,774 | 1/1935 | Hopfner | 210/281 |
| 2,192,451 | 3/1940 | Moore | 210/241 |
| 2,316,526 | 4/1943 | McDonald | 160/104 |
| 2,657,964 | 11/1953 | Watrous | 108/157.17 |
| 2,669,117 | 2/1954 | Fuhrmann | 108/101 |
| 2,829,934 | 4/1958 | Schulze | 108/157.1 |
| 3,082,587 | 3/1963 | Brimberg | 55/495 |
| 3,374,891 | 3/1968 | Buchmann | 210/126 |
| 3,432,038 | 3/1969 | Heskett | 210/96 |
| 3,460,566 | 8/1969 | Heartstedt et al. | 137/571 |
| 3,502,442 | 3/1970 | Campbell et al. | 422/261 |
| 3,623,978 | 11/1971 | Boze | 210/732 |
| 3,684,457 | 8/1972 | Pinto et al. | 422/274 |
| 3,732,165 | 5/1973 | Campbell | 210/190 |
| 3,760,753 * | 9/1973 | Mertens | 114/257 |
| 4,013,556 | 3/1977 | Evans | 210/136 |
| 4,235,340 | 11/1980 | Clack et al. | 206/515 |
| 4,260,487 | 4/1981 | Gruett | 210/190 |
| 4,425,852 * | 1/1984 | Rivierre | 108/56.3 |
| 4,623,367 | 11/1986 | Paulson | 55/385.8 |
| 4,718,447 | 1/1988 | Marshall | 137/268 |
| 4,753,726 | 6/1988 | Suchanek | 210/232 |
| 4,764,280 | 8/1988 | Brown et al. | 210/662 |
| 4,946,600 | 8/1990 | Shin | 210/758 |
| 5,310,488 | 5/1994 | Hansen et al. | 210/674 |
| 5,340,485 * | 8/1994 | Bradley et al. | 210/767 |
| 5,411,717 | 5/1995 | Peddicord et al. | 422/275 |
| 5,643,541 | 7/1997 | Peddicord et al. | 422/275 |

FOREIGN PATENT DOCUMENTS 64147 9/1892 (DE).

* cited by examiner

*Primary Examiner*—Shrive Beck
*Assistant Examiner*—Alexa A. Doroshenk
(74) *Attorney, Agent, or Firm*—Thompson & Gustavson, L.L.P.

(57) ABSTRACT

A grid (250, 280) is disclosed which can be used as part of a salt platform (10, 50, 80) to support salt in an ion exchange water softener. The grid is preferably formed of ABS plastic and has a border portion (252) and bands (254, 256) without holes (274) formed therethrough for strength. When the grid is used as part of a salt platform having vertically oriented members (12–24) with open upper ends, cap portions (258–270), without holes formed therethrough, are used to cover the upper ends of the members. A ring (350) can be used to fit the salt grid in the brine tank.

13 Claims, 9 Drawing Sheets

SALT PLATFORM

This application is a division of application Ser. No. 08/594,245, filed on Jan. 30, 1996, now U.S. Pat. No. 5,788,933, which is a Continuation-In-Part (CIP) of application Ser. No. 08/450,896, filed on May 26, 1995, now U.S. Pat. No. 5,643,541, which is a Continuation-In-Part (CIP) of application Ser. No. 08/432,728, filed on May 2, 1995, now abandoned.

TECHNICAL FIELD OF THE INVENTION

This invention relates to water softeners using salt, and in particular to a platform for supporting the salt.

BACKGROUND OF THE INVENTION

Water softeners find wide applications throughout society. In many applications, it is desirable to soften the water by removing the hardness minerals from the water before use. This is particularly critical in boiler operation where use of hard water will create boiler scale and rapidly reduce operating efficiencies.

A common water softening process is to use water softeners designed for this purpose. Water softening tanks contain cation exchange resin capable of exchanging hardness ions, i.e., calcium and magnesium for sodium ions which are very soluble.

When the hardness exchanging capacity of the water softening resin has exhausted it stops producing soft water. It then becomes necessary to regenerate the resin with a saturated solution of sodium or potassium chloride. Because of cost, sodium chloride is usually the chemical of choice.

Sodium chloride brine solution is made in a separate tank built and designed for this purpose, and this tank is called a brine tank.

Modern water softeners are well engineered and designed to produce soft water with all regeneration actions done automatically, including the transfer of the saturated brine from the brine tank to the water softener tanks.

In order for the water softener resin to be properly rejuvenated, the saturated brine solution must be of high quality and a measured volume must be delivered whenever needed.

A properly designed and engineered brine tank will provide these needs by delivering a measured quantity of saturated salt brine containing a fixed amount of dissolved salt per gallon of water.

This is accomplished by using a horizontal salt grid in a vertical tank. The height and diameter of the salt grid varies for each softening system, depending on many factors, but in all cases the height of the salt grid sets the volume of water in the brine tank.

In actual practice, the brine system is set to fill the brine tank with fresh water from the bottom of the tank to approximately 1" above the salt grid and then shut off.

Using this method, only 1" of water touches the vertical salt pile, which may be several hundred pounds in weight, stored on top of the salt grid.

This system is called a dry salt shelf system, as opposed to a wet salt brine tank system where most or all the salt is immersed in water. The dry salt shelf system has significant advantages over the wet salt system. The dry salt shelf method produces 100% saturated brine (specific gravity 1.2) all the time where wet salt methods do not. The dry salt shelf system affects more dry salt storage in the same size brine tank than a wet salt system. A dry salt shelf system is easier to keep clean than the wet salt system. A dry salt shelf system does not require a gravel support bed at the bottom of the brine tank. The dry salt shelf system offers lower maintenance costs to the operator, no gravel cleaning or replacement.

The dry salt shelf system has no messy brine float valves as used above the liquid brine on wet salt systems. These float valves become corroded with salt creep and require repair and/or replacement frequently. The dry salt shelf system uses brine float or refill valves in the lower section of the brine tank (below the shelf) and are less exposed to the risk of malfunctions or corrosion, thus operating more efficiently. The dry salt shelf system uses all of the salt stored before the brine tank needs to be refilled. Liquid below the shelf is saturated brine even if only one grain of salt remains on the shelf. The brine tank salt refill is less often with the dry salt shelf system because of the greater salt storage capacity it offers. Brine tank corrosion is reduced or eliminated on steel brine tanks with the dry salt shelf system because the liquid level is down below the dry salt, thus less air/brine exposure. The dry salt shelf system allows more programmed salt delivery scheduling because the salt stored is easily seen and thus the quantity remaining can be easily determined. The dry salt shelf system allows the use of all grades of salt, even the most economical rock type salt. The dry salt shelf type brine system can be cleaned in less than one hour, regardless of size whereas a wet salt tank may take one day and require the water softener to be down.

Dissolving of salt starts immediately and continues until the volume of water beneath the salt grid becomes saturated with dissolved salt. When saturation occurs, dissolving ceases. Stored salt above the salt grid not in contact with the water remains dry, preventing bridging and mushing.

Using a salt grid enables an engineer to calculate the quantity and quality of a particular size brine tank will produce. The engineer then is able to select the proper brine tank for the water softener system. It is imperative that the grid and support system be strong to support the mass of weight placed upon it. Until now, salt grids and support systems have usually been made from pegboard. It is readily available and cheap; however, in contact with the salt brine it tends to deform, warp and those portions of the salt grid left unsupported tend to break and collapse, dumping the salt stored on them down into the brine measuring area.

When this occurs, it causes the water softener to malfunction.

The salt grid and support system must be rebuilt, and in time it fails again.

For these reasons, the salt grid and support system could not be used in larger brine tanks.

As the demand increased for larger and larger water softeners, the demand for more saturated brine increased.

In order to provide this requirement, brine tanks increased in size and the pegboard salt grid and support system could not be used as they were not strong enough to hold the weight.

These larger systems were forced to use the less efficient older method of wet storage.

This method consists of loading the brine tank with several hundred pounds of gravel on the bottom. Several hundred pounds of salt is then poured upon the gravel and water is then added until a portion or all of the salt is submerged.

The measuring advantage of the salt grid system is lost.

The salt brine produced by the wet salt storage method is often of poor quality and submerged salt tends to bridge and mush, causing maintenance problems.

The salt grid plate and support system we have designed and built is strong enough that it may be used in the larger systems.

Again, the engineer can calculate the exact quantity of brine needed by utilizing the salt grid method.

SUMMARY OF THE INVENTION

In accordance with one aspect of the present invention, an improved salt platform grid is provided which is formed of ABS plastic. The grid is circular and has a border about the outer rim thereof and at least one band extending from the outer rim through the center of the grid. A plurality of holes are formed through the grid between the border and the band.

In accordance with another aspect of the present invention, the grid is formed with dual bands, intersecting at the center of the grid at a 90° angle. In accordance with another aspect, the grid is formed with a well opening therein.

In accordance with another aspect of the present invention, a salt platform is provided in which the grid is used. The platform includes a plurality of vertically oriented members with upper ends, the upper ends of the vertically oriented members being open. The grid has cover portions sized to cover the open upper ends of the vertically oriented members when the grid is set atop the upper ends of the vertically oriented members, none of the holes being formed through the cover portions.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION

Figure 1:
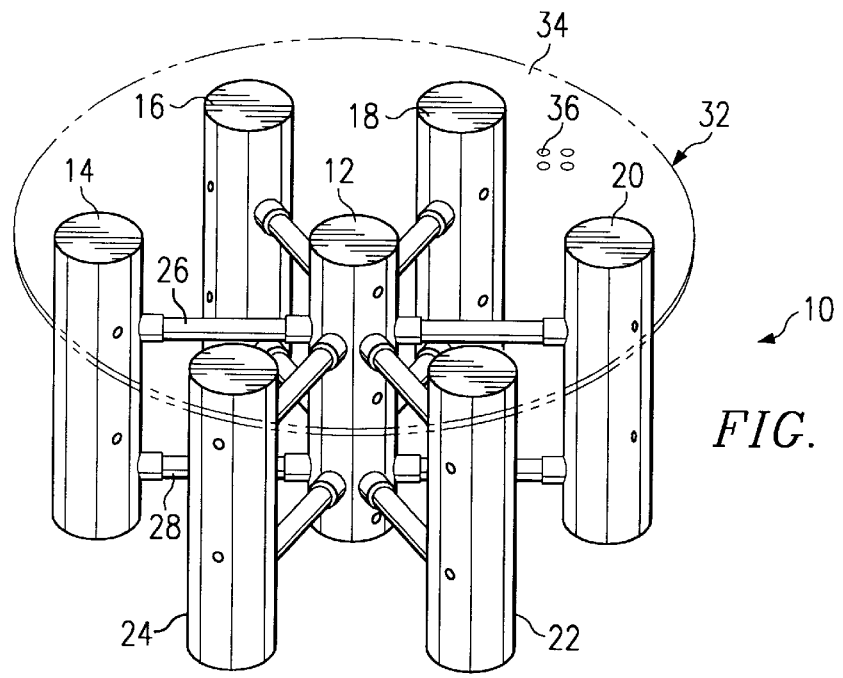
FIG. 1 is a perspective view of a salt platform forming a first embodiment of the present invention.
Figure 2:
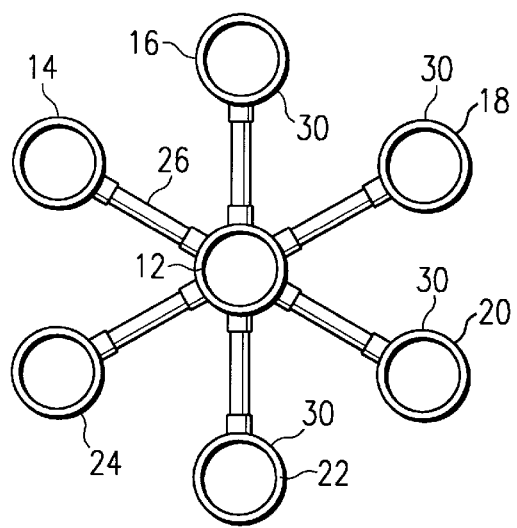
FIG. 2 is a top view of the salt platform.
Figure 3:
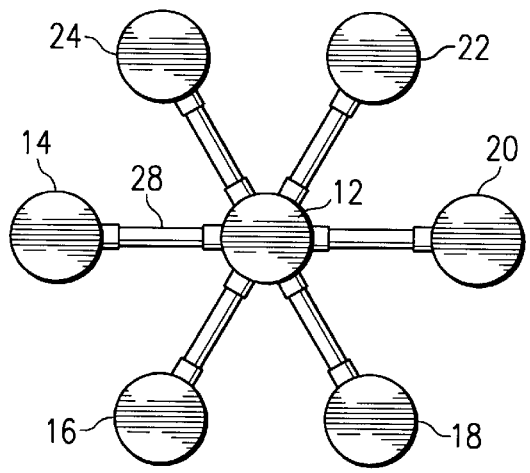
FIG. 3 is a bottom view of the salt platform.
Figure 4:
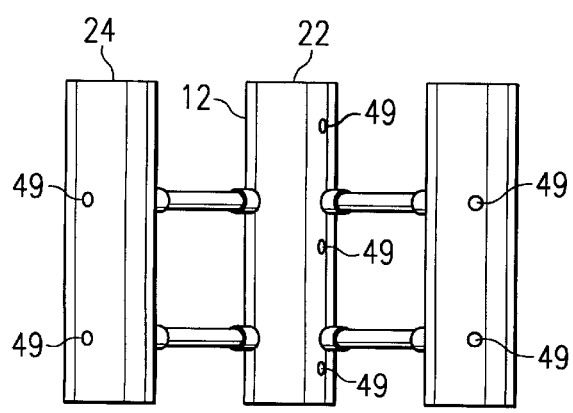
FIG. 4 is a side view of the salt platform.
Figure 5:
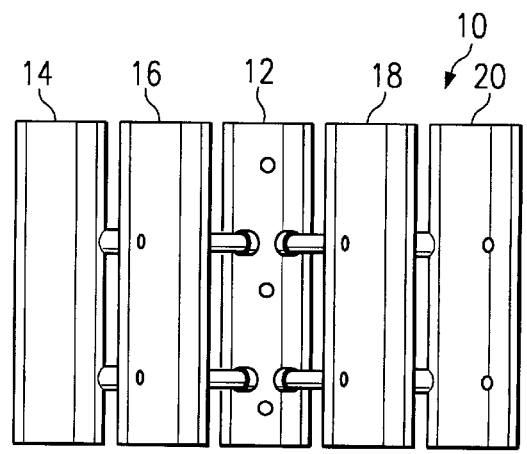
FIG. 5 is another side view of the salt platform taken from an angle different than FIG. 4.
Figure 6:
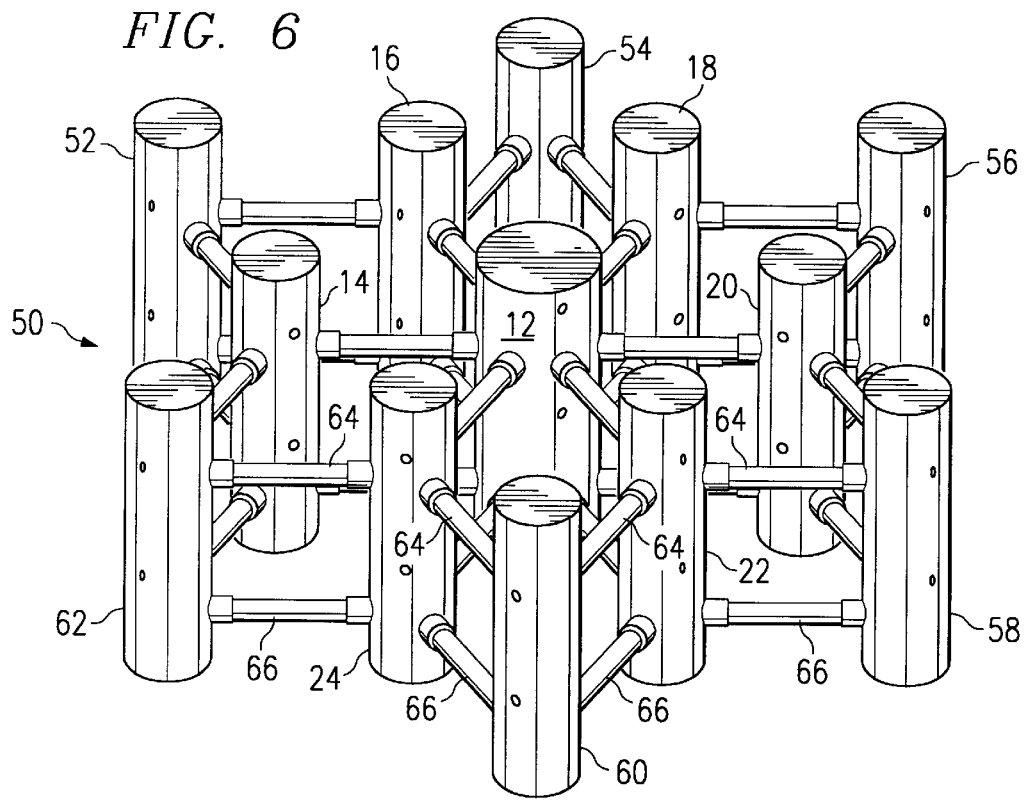
FIG. 6 is a perspective view of a salt platform forming a second embodiment of the present invention.
Figure 7:
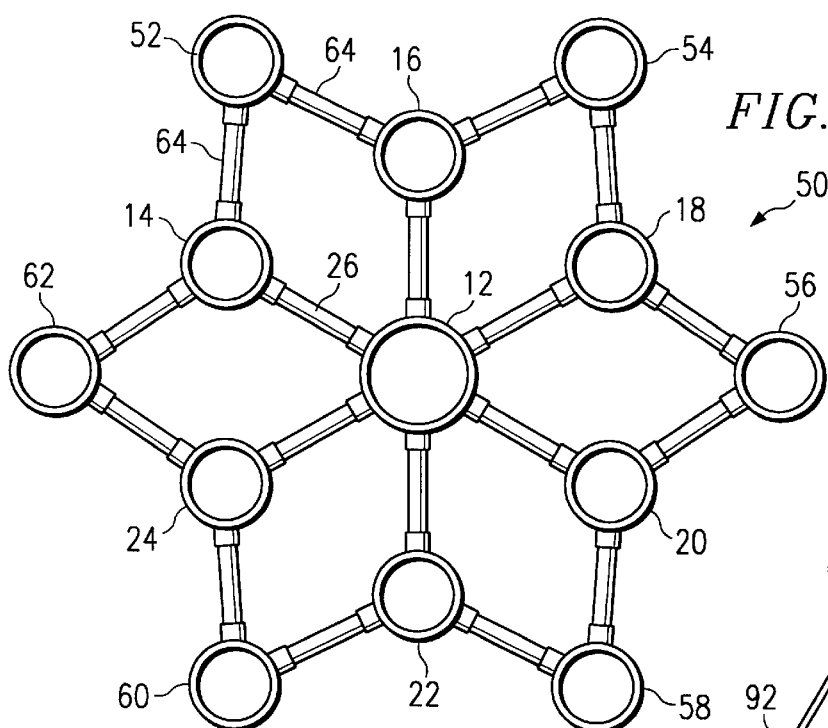
FIG. 7 is a top view of the salt platform of FIG. 6.

With reference now to the accompanying drawings, wherein like or corresponding parts are designated by the same reference numeral, and with specific reference to FIGS. 1–5, a salt platform 10 is disclosed which forms a first embodiment of the present invention. The platform will be positioned within a tank containing salt which forms part of a water softener. Frequently, the tank is a stand alone unit which contains only the salt and the platform. Water is then circulated through the tank where sodium chloride is dissolved to substitute for the minerals in the water.

The salt platform 10 can be seen to include a central vertically oriented cylinder 12 and a series of radial vertically oriented cylinders 14–24. Each of the radially oriented cylinders is attached to the central cylinder by a pair of horizontal bracing members 26 and 28. In the preferred embodiment, the cylinders and bracing members are formed of PVC plastic. The cylinder 12 can be 6 inches in diameter and the cylinders 14–24 4 inches in diameter. The bracing members are preferably glued to the cylinders with a commonly available PVC glue such as used in plumbing to join PVC pipe sections together.

The upper end 30 of each of the cylinders can be seen to lie in a common plane 32. A grid 34 is preferably supported on the upper ends of each of the cylinders which, in turn, is in direct contact with the salt supported by the platform. Preferably the grid 34 has a plurality of apertures 36 formed therethrough for easy passage of the water through the salt. In the preferred embodiment, the grid is made out of ABS plastic and is one-quarter inch thick. The grid is cut to a diameter slightly less than the diameter of the tank in which the platform is used. A sufficient number of apertures are then formed through the grid to provide the necessary path for water flow. The apertures can be ⅛" or ¼", for example. In one technique, a common sheet of perforated peg board can be laid on top of the grid and used as a pattern to drill the holes through the grid. Clearly, the grid can be molded with the holes in place if this is more economical.

By using a plurality of vertically oriented cylinders, interconnected by bracing members, the load of salt is uniformly supported. It is common for water softeners to employ hundreds of pounds of salt and the platform must be sufficiently strong to support this weight. Because a plurality of vertically oriented members are used, the invention works well regardless of the specific platform height or width that is used. In order to uniformly support the entire weight bearing surface of the salt grid, all of the area which is beneath the salt grid to the bottom of the tank and the sidewall to sidewall is used to support the grid by suitable placement of the vertically oriented members and the horizontal bracing members. The salt platform can be used in tanks having a diameter range of between 18" and 72", for example. Moreover, the tanks need not be cylindrical, but can have a square or other cross-section.

Each of the vertically oriented cylinders has a series of holes 49 formed through the wall of the cylinders distributed along its length. These holes 49 allow water to fill the interior of the cylinders relatively early in the filling of the tank so that the platform will not lift or shift position due to buoyancy. Similarly, the holes will permit water to drain from the cylinders as the tank is drained. The holes can be ½" diameter, for example.

With reference now to FIGS. 6–10, a second embodiment of the present invention is illustrated as salt platform 50. A number of elements of salt platform 50 are identical to that of salt platform 10 and are identified by the same reference numeral. However, in salt platform 50, a second set of radial vertically oriented cylinders 52–62 are distributed at uniform radial distances from the central cylinder 12. Bracing members 64 and 66 are used to secure each of the cylinders 52–62 to two of the adjacent radial cylinders 14–24.

Figure 11:
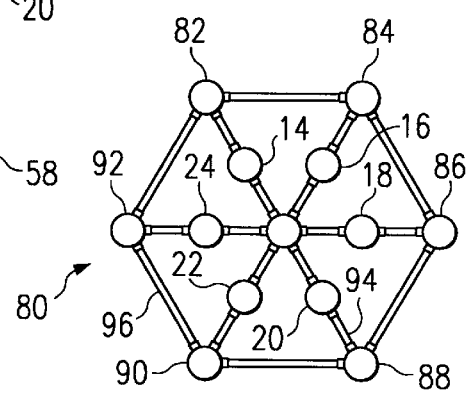
FIG. 11 is a schematic view of a third embodiment of the present invention.
Figure 8:
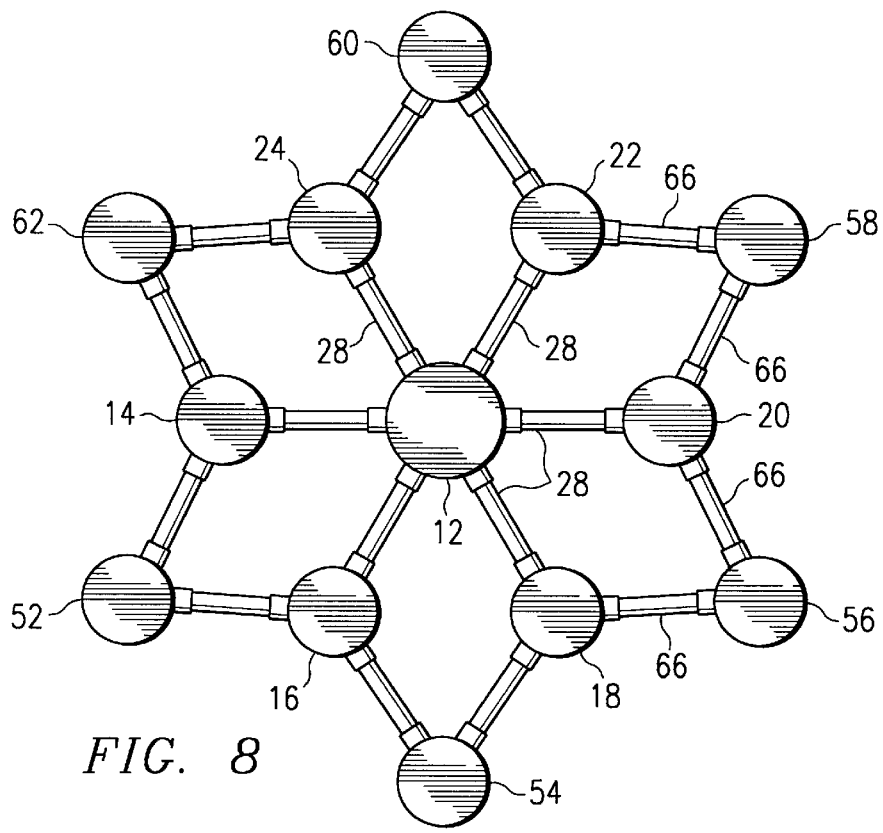
FIG. 8 is a bottom view of the salt platform of FIG. 6.
Figure 9:
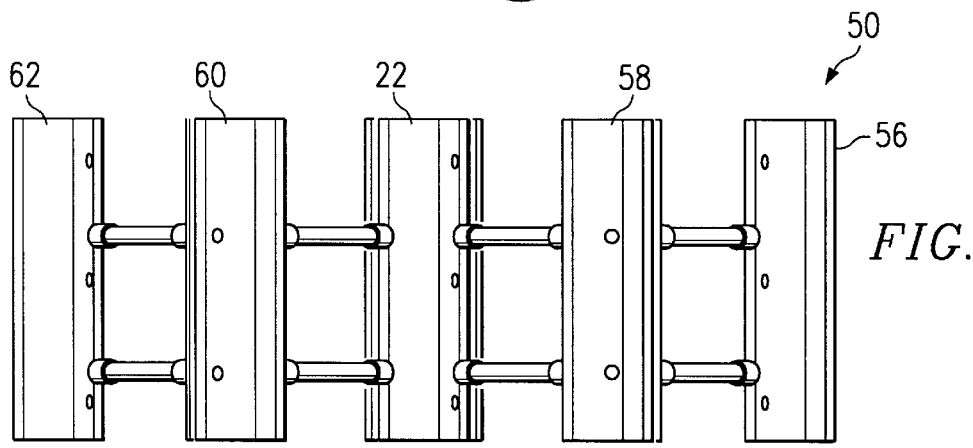
FIG. 9 is a side view of the salt platform of FIG. 6.
Figure 10:
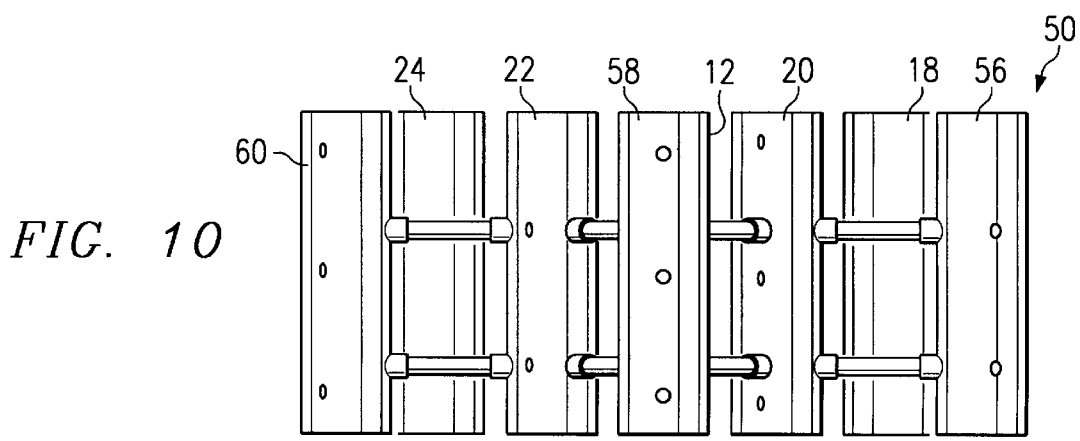
FIG. 10 is another side view of the salt platform of FIG. 6 taken from an angle different than FIG. 9.

With reference to FIG. 11, a third embodiment of the present invention is illustrated and forms salt platform 80. Again, a number of elements of salt platform 80 are identical to that of salt platform 10 and are identified by the same reference numeral. Salt platform 80 is provided with a second set of radial vertically oriented cylinders 82–92 which are spaced on the same radial lines as the cylinders 14–24. Each of the cylinders 82–92 are connected to adjacent cylinders by radial bracing members 94 and circumferential bracing members 96.

Figure 12:
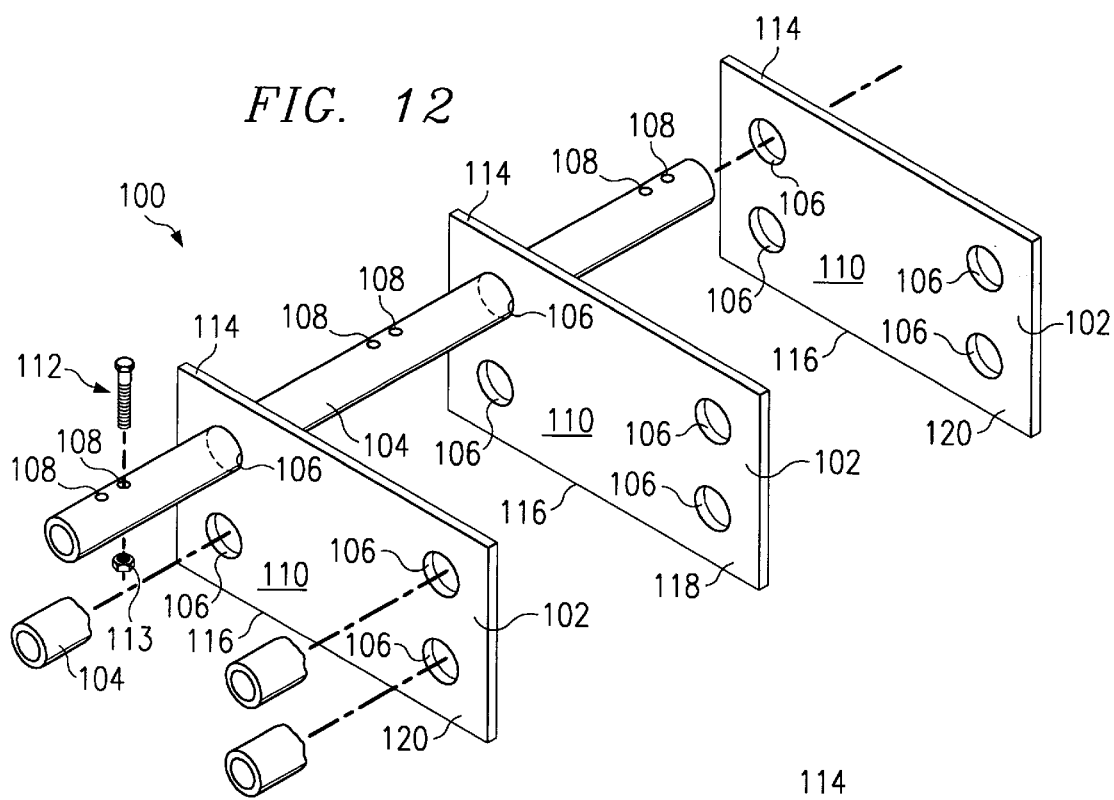
FIG. 12 is a perspective view of a fourth embodiment of the present invention.
Figure 13:
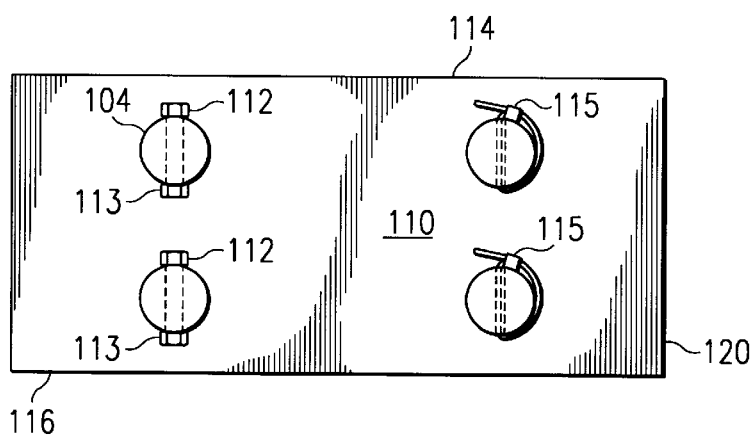
FIG. 13 is a side view of the embodiment of FIG. 12.
Figure 14:
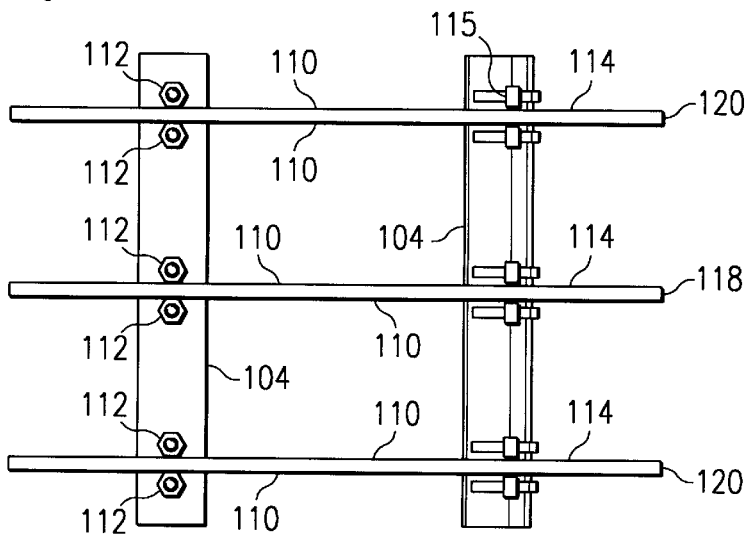
FIG. 14 is a top view of the embodiment of FIG. 12.

With reference now to FIGS. 12–14, a fourth embodiment of the present invention is illustrated as salt platform 100. Salt platform 100 can be seen to include a series of vertically oriented sheets 102, preferably formed of ABS (acrylonitrile butadiene styrene) plastic. The sheets are connected together in a spaced apart relation by a series of horizontal tubes 104, preferably formed of PVC pipe. The tubes 104 pass through suitably formed apertures 106 in the sheets. Holes 108 are formed through the tubes 104 immediately adjacent the surfaces 110 of the sheets to hold the platform together. A bolt 112 or other suitable fastener can be passed through each of the holes and secured therein, as by nut 113 so that the tube is locked in place relative to the sheets. Alternatively, fasteners such as plastic wire ties 115 can be passed through the holes to act in a similar manner. Other suitable fasteners would include clips, pegs, pins, and the like.

The salt platform 100 is positioned within the water softener with the upper edges 114 of the sheets 102 supporting the salt platform. The lower edges 116 rest on the bottom of the water softener tank.

As can be understood, the sheets can be any suitable length to fit the particular tank used. For example, the middle sheet 118 may be longer than the end sheets 120 if the tank is circular. Further, the lower edges 116 of the sheets can be curved in any desired configuration to better fit the contour of the water softener tank. Any number of sheets can be placed side by side by simply lengthening the tubes 104 and providing suitable mounting holes adjacent the position of each sheet.

As can be readily understood, a key part of the invention is the ability to distribute the salt load through a plurality of vertically oriented members distributed relatively uniformly underneath the salt grid. The members need not the circular. However, PVC pipe is commonly available and is inexpensive and forms a very effective member for use in this application. The use of PVC (polyvinyl chloride) and ABS plastic have the advantage of being very inert to brine and would be expected to have very long service life in this application. However, any other material can be used to form the platform and grid which is strong enough and inert to the brine solution. An example of suitable materials include, but is not limited to, acrylics, plexiglass, fiberglass, polyethylene, polypropylene, polycarbonate, NORYL®, KEVLAR® and metal structures made impervious to the brine solution by resin or asphalt type coatings.

Figure 15:
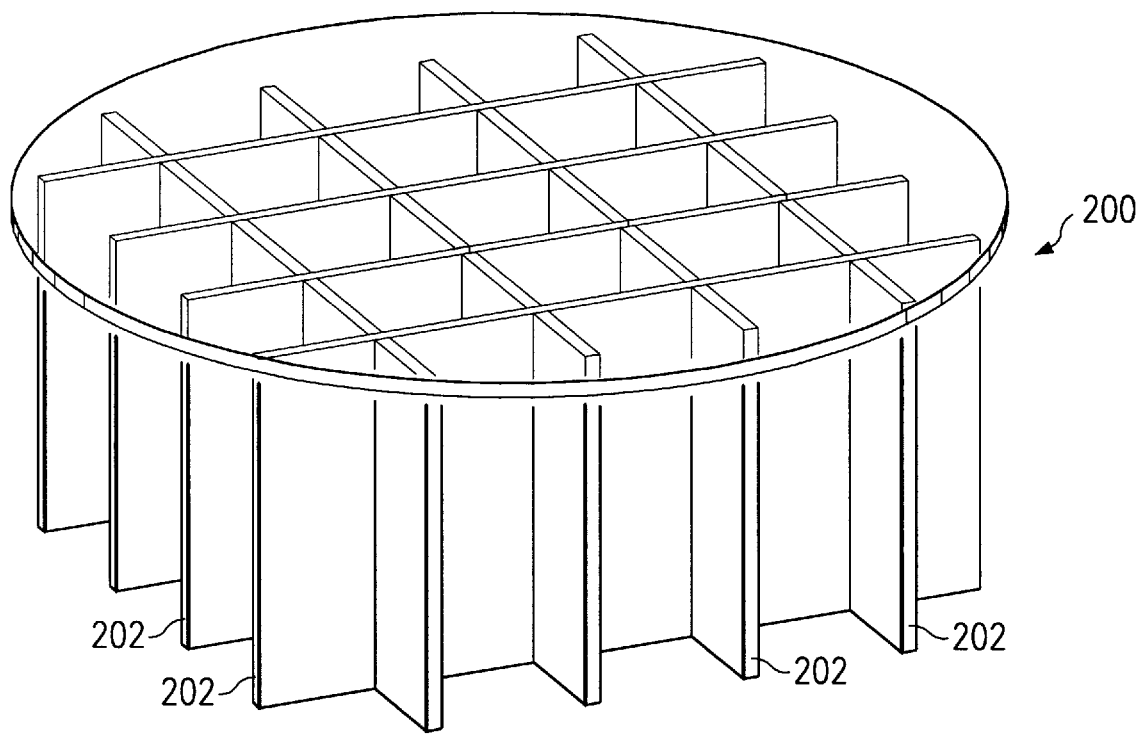
FIG. 15 is a perspective view of a fifth embodiment of the present invention with slotted sheets.
Figure 16:
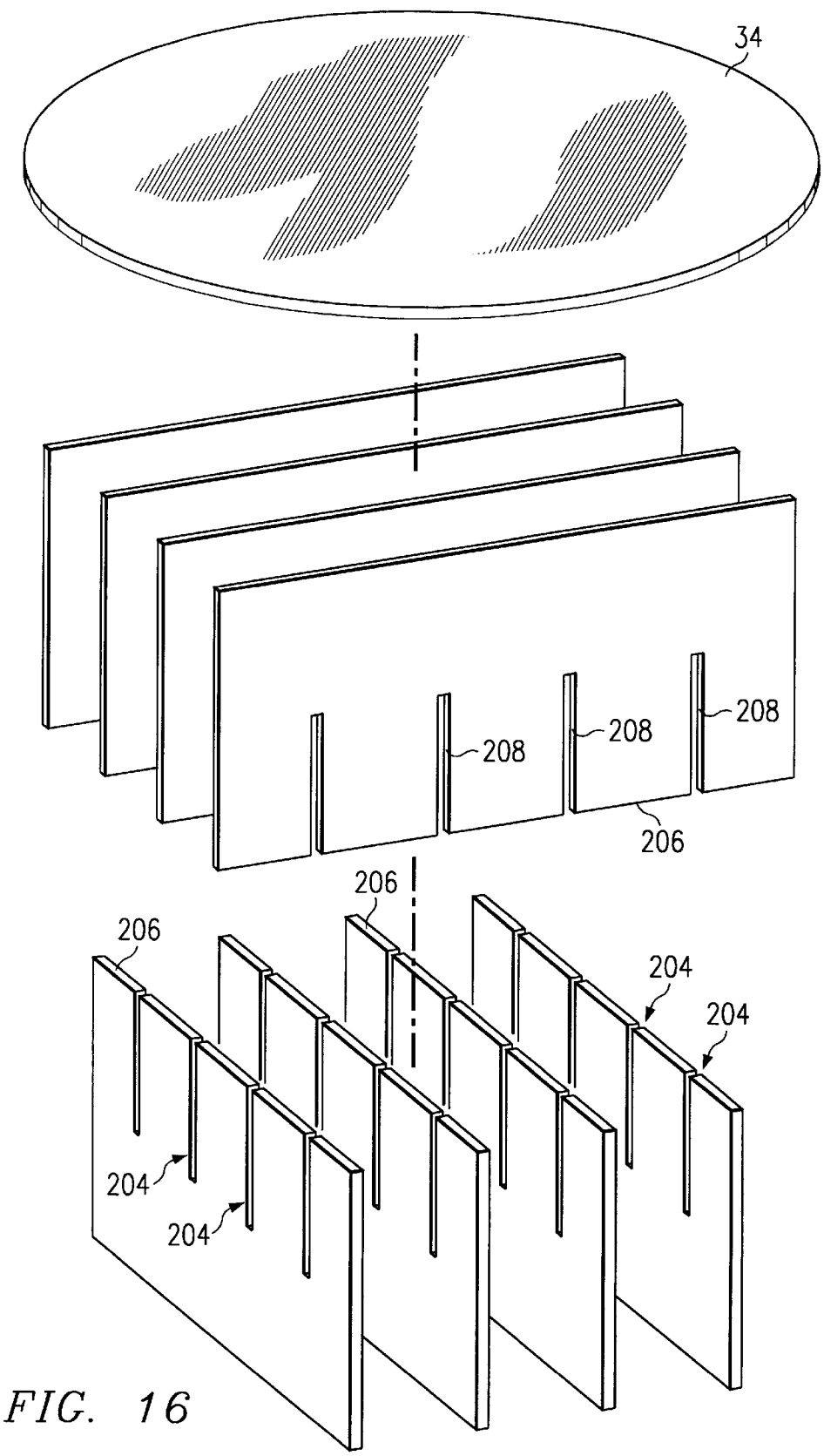
FIG. 16 is an exploded view of the embodiment of FIG. 15.

With reference now to FIGS. 15 and 16, a fifth embodiment of the present invention is illustrated as salt platform 200. Salt platform 200 can be seen to include a series of vertically oriented sheets 202, preferably formed of ABS plastic. Each sheet has a series of slots 204 formed into the sheet from one edge 206. As can be seen in FIG. 16, the sheets can be mated to each other, with the slots of one sheet mating with the slots of another sheet, to form a rigid, self-standing platform, as seen in FIG. 15. Preferably, the slots extend somewhat over one-half of the way from edge 206 to the opposite edge so that, when the sheets are mated, the top edges of the sheets lie in the same plane to uniformly support the grid 34. Also, the bottom edges of the sheets should lie in the same plane if the bottom of the tank is flat to uniformly distribute the load along the bottom of the tank.

While eight sheets are shown in FIGS. 15 and 16, it is clear that any number of sheets can be used. For example, two sheets can be interconnected to form a platform. Three sheets can be mated in a triangular form to form a platform and four or more sheets can be mated to form various configurations. As will be clearly understood, the edges 208 of the slots engage the surface of the mating sheet to form a rigid construction without the use of any fasteners whatsoever.

Figure 17:
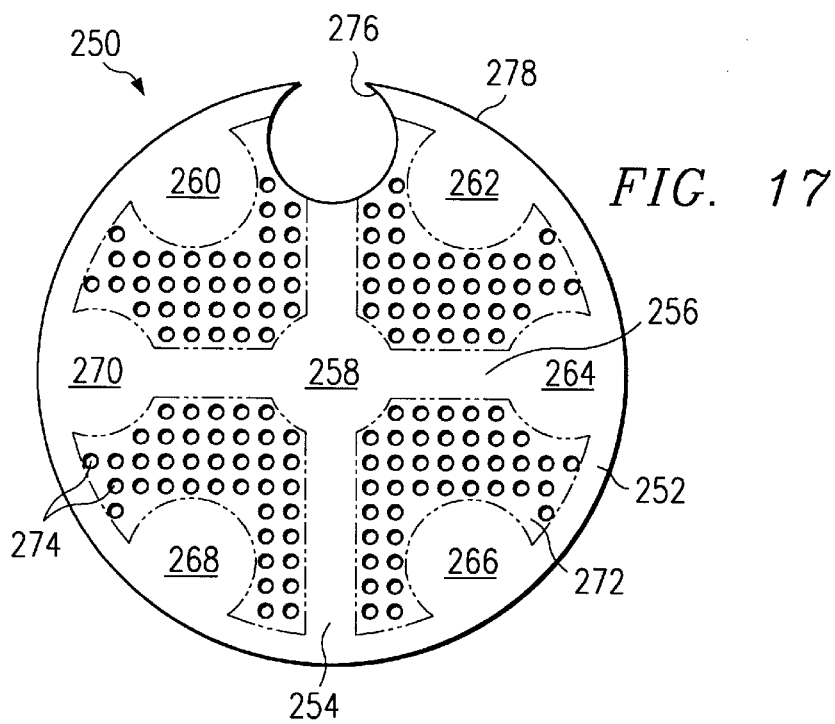
FIG. 17 is a plan view of an improved salt grid for use with the salt platform of the present invention.

With reference now to FIG. 17, a grid 250 is illustrated which is intended to form part of the salt platform 10 described previously. The grid is preferably formed of ABS plastic, having a thickness of ⅛ or ¼ inch. The typical pegboard used in previous salt platforms is usually available only in sheets of 4 foot by 8 foot, limiting the size of the grid formed thereby to a 4 foot diameter. ABS plastic sheet is available up to 10 feet square and grids can therefore be made larger than previous designs using peg board. The ABS plastic is much stronger than peg board and is inert in the salt water brine found in brine tanks.

The grid 250 has a circular shape and defines a border portion 252, a first band 254 and a second band 256. The grid also defines a central cap portion 258 and a series of radial cap portions 260–270. The remaining portion 272 of the grid has a plurality of small holes 274 drilled therethrough for water to pass and mix with salt supported on the grid.

The grid 250 is designed to be set atop the central vertically oriented cylinder 12 and the radial vertically oriented cylinders 14–24. The upper ends 30 of each of the cylinders need not be closed off as the grid 250 is oriented relative to the cylinders 12–24 so that the central cap portion 258 rests atop the upper end of the central vertically oriented cylinder 12 and each of the radial cap portions 260–270 rest atop one of the radial vertically oriented cylinders 14–24. Thus, the labor necessary in individually installing a cap at the upper end of each of the cylinders is eliminated. By capping the cylinders 12–24, debris is prevented from entering the interior of the cylinders.

The use of a border portion 252, which, for a grid having a 50 inch diameter, might be 2 inches wide, and the bands 254 and 256, which, for a 50 inch diameter grid may be about 4 inches in width, provides great structural strength even though the portion 272 is formed with a plurality of holes therein.

To correspond with the dimensions previously recited for the cylinders 12–24, the radial cap portion 258 will be at least 6 inches in diameter if cylinder 12 is 6 inches in diameter and the radial cap portions 260–270 will be at least 4 inches in diameter if the cylinders 14–24 are 4 inches in diameter. Grid 250 is intended to be a direct substitute for the grid 34 previously described.

The grid 250 has a well opening 276 formed therethrough near the circumferential edge 278 thereof. Clearly, the grid 250 can be adapted for use with the salt platform 50 or salt platform 80 described above with sufficient cap portions to fit over the upper ends of the vertical cylinders thereof.

If desired, the grid 250 can be formed with the entire grid being like portion 272 with holes 274 formed uniformly therethrough about the entire grid. This might be a suitable universal design for use in salt platforms of types other than those described above.

Figure 18:
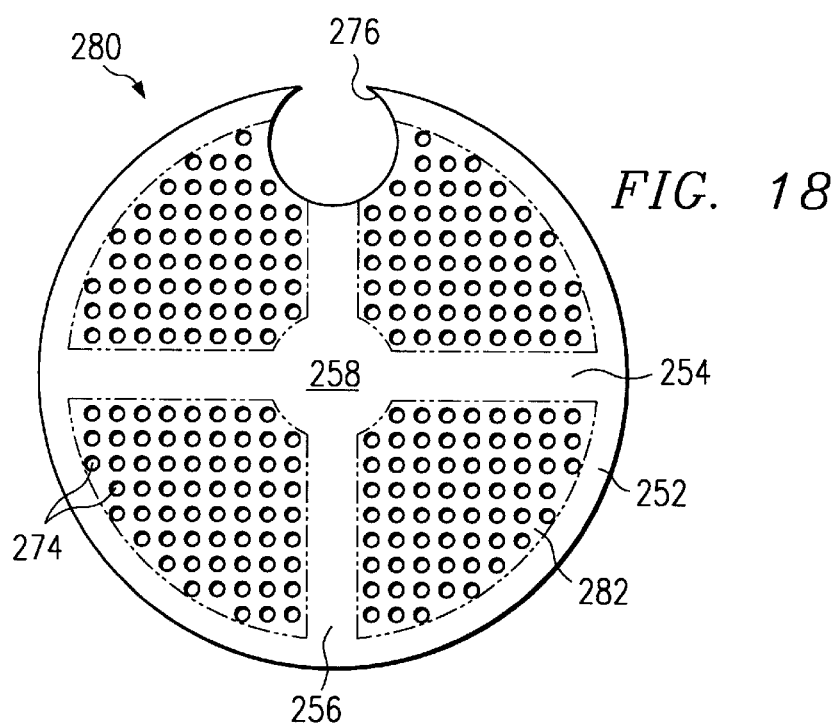
FIG. 18 is a plan view of an improved salt grid for use with the salt platform forming the first embodiment of the present invention.

Alternatively, a grid 280 of the type shown in FIG. 18 can be used. Grid 18 incorporates border portion 252 and first and second bands 254 and 256, central cap portion 258 and the well opening 276. However, no radial cap portions are provided and the remaining portion 282 between the bands 254 and 256 and portions 252 and 258 are formed with uniformly distributed holes 274 therein. Again, the use of portions 252 and 258 and bands 254 and 256 provide great strength to the grid while sufficient holes 274 are formed through the grid for it to work effectively in the brine tank.

The well opening typically will be about 3½ inches to 6¼ inches. Grids are typically cut to fit for new tanks. Large brine tanks have a variance in diameter and it is best to fit the grid at the shop to give a snug fit as the tank diameter varies slightly from tank to tank. Retrofitting grids in existing large brine tanks that have been in service for some time may dictate cutting the grid to dimensions less than that to which the brine tank was originally designed as time and service may have caused the tanks to be warped out of round.

Using grids of the type described herein, forming a grid for a brine tank having a diameter of 50 inches or larger is possible. This size tank has never been able to be fitted with a grid formed of peg board in the past because of size limitations in the material available. Because of variation in tank size, the border portion 252 is useful, permitting portions of the border to be cut away to fit a particular tank without cutting through any of the holes 274 formed in the grid.

Figure 19:
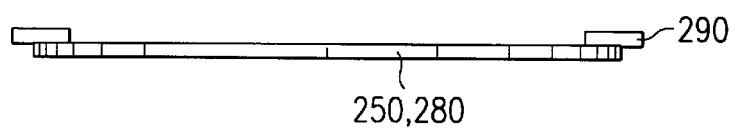
FIG. 19 is a side view of the improved salt grid.

Another variation is to form a spacer ring 290 of a diameter somewhat larger than the diameter of the grid and an inner diameter somewhat smaller than the inner diameter of the border portion 252. The grid 250 or 280 is then cut to a diameter somewhat less than the diameter of the tank and the spacer ring is inserted in the tank on top of the grid with the outer diameter of the spacer ring approximating the diameter of the brine tank. The spacer ring can move about somewhat on the top of the grid 250 or 280 and then be secured to the grid by fasteners, such as wire ties, to prevent salt from slipping between the grid edges and the wall of the brine tank. Such a spacer ring 290 is illustrated in FIG. 19.

Figure 20:
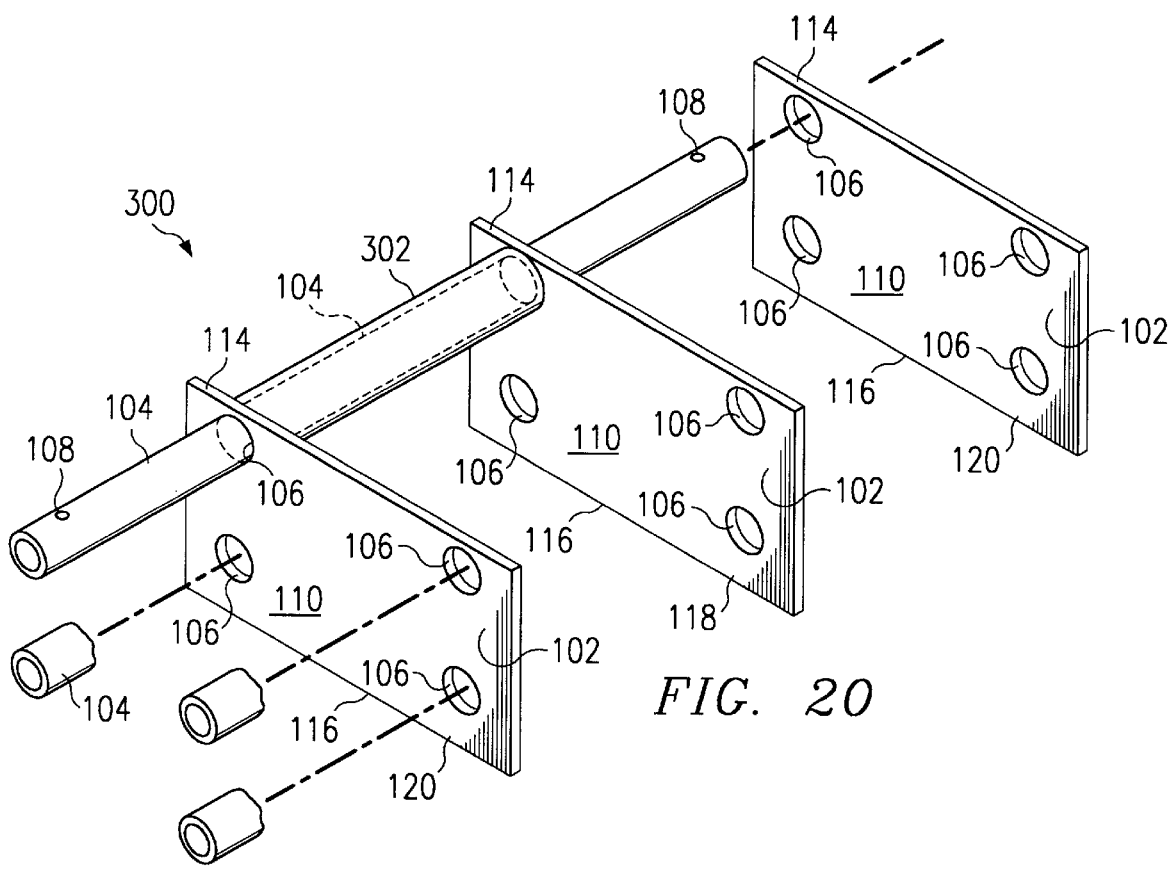
FIG. 20 is a perspective view of a modification of the fourth embodiment of the present invention.
Figure 22:
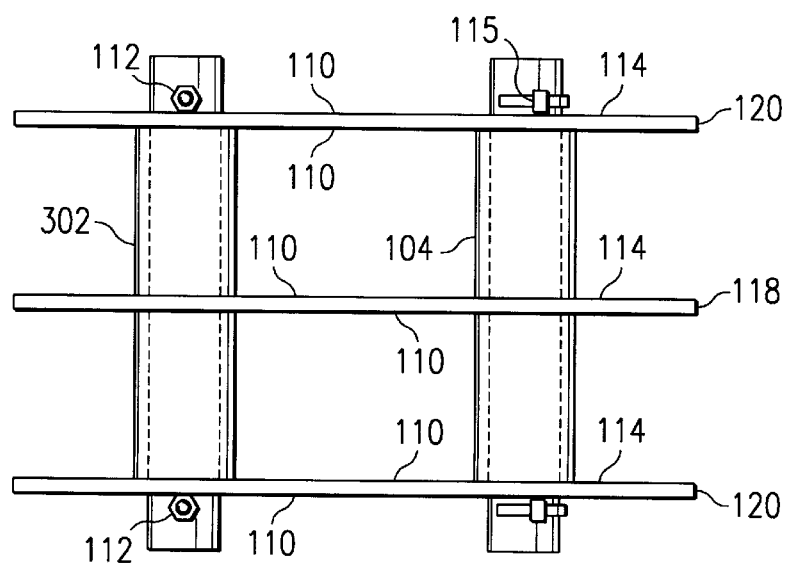
FIG. 22 is a plan view of the embodiment of FIG. 20.
Figure 21:
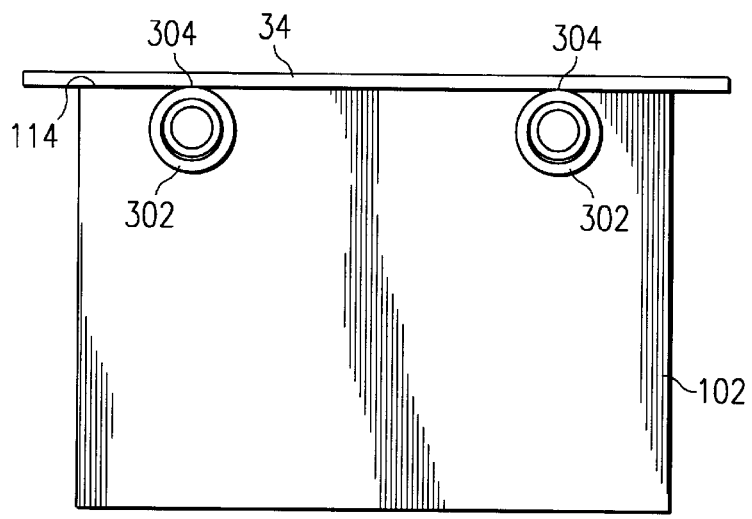
FIG. 21 is a vertical cross-sectional view of the embodiment of FIG. 20.

With reference now to FIGS. 20–22, a modification of the fourth embodiment of the present invention is illustrated as salt platform 300. Many elements of salt platform 300 are identical to that of salt platform 100 and are identified by the same reference numeral. Salt platform 300 differs from platform 100 in the use of spacer tubes 302 which are slid over and concentric with the tubes 104 between each of the sheets 102. This eliminates the need to have bolts or ties except at the ends of the tubes 104. The length of the spacer tubes 302 is selected to represent the desired separation between each of the sheets 102 and, when the salt platform is assembled and bolts or ties 112 or 115 are inserted through the holes 108 at the ends of each of the tubes 104, the sheets 102 are held in the proper spacing by the spacer tubes 302. The spacer tubes 302 have a larger diameter than the apertures 106 formed through the sheets 102 and have a sufficiently large inner diameter to fit over the tubes 104, preferably in a slip fit.

As illustrated in FIG. 21, the use of the spacer tubes 302 also provides an additional advantage with the top row of tubes 104. The apertures 106 near the upper edge 114 of each of the sheets 102 are formed sufficiently close to the edge so that the upper surface 304 of the spacer tubes 302 proximate the upper edge are substantially coplanar with the edges 114. This provides additional support for the grid 34 laid atop the salt platform. Preferably, the apertures 106 in the top row are formed through the sheets 102 with the distance from the upper edge of each aperture to the upper edge 114 equal to the thickness of the spacer tube 302.

The parts of salt platform 300, particularly spacer tubes 302, can be made of PVC plastic. However, other materials can be used, including, but not limited to, acrylics, plexiglass, fiberglass, polyethylene, polypropylene, polycarbonate, NORYL®, KEVLAR® and metal structures made impervious to the brine solution by resin or asphalt type coatings.

Figure 23:
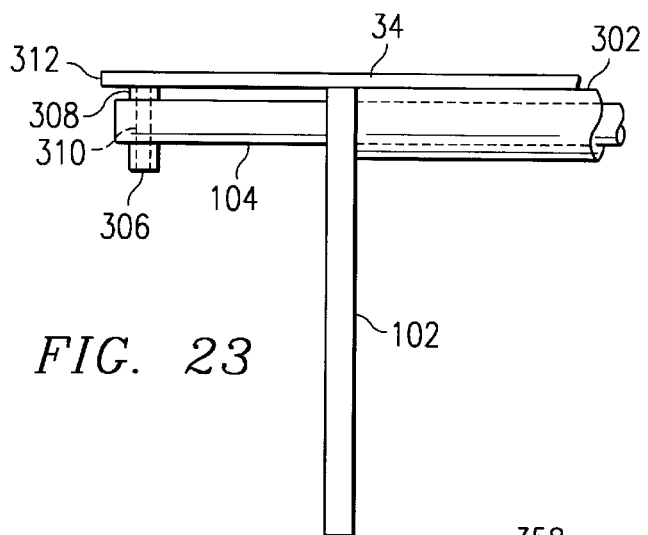
FIG. 23 is a detail view of the additional support for the salt grid.

An additional feature of salt platform 300 is shown in FIG. 23. A hole 310 is formed at the end of the top row of tubes which project a significant distance beyond the outer most sheets 102. This includes the tubes 104 passing through the center portion of the sheets 102 where there is a large distance from the outermost sheets 102 to the inner surface of the brine tank. The salt grid 34 is only supported by the sheets 102 and the spacer tubes 302 between the sheets, not outside the limits of the sheets 102. These holes 310 can receive a bolt 306 which has a head 308 of thickness sufficient so that the grid 34 is in contact with the head 308 of the bolt 306, which provides support for the salt grid 34 near its edges 312 most distant from the sheets 102. Bolt 306 can be of PVC, or other suitable material as noted above.

In one embodiment constructed in accordance with the teachings of the present invention, the head of the bolt is about one-eighth inch thick and the distance from the top of the apertures 106 to the upper edges 114 is about one-eighth inch. The wall thickness of tubes 302 is also about one-quarter inch.

Figure 24:
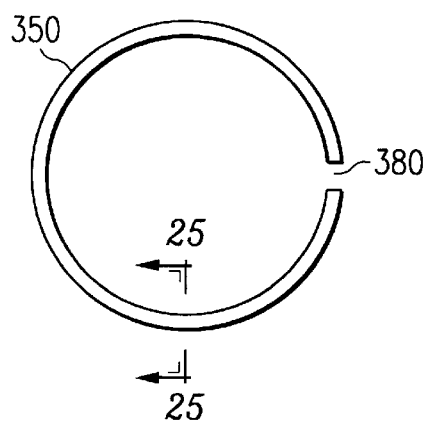
FIG. 24 is a plan view of a salt grid ring.
Figure 25:
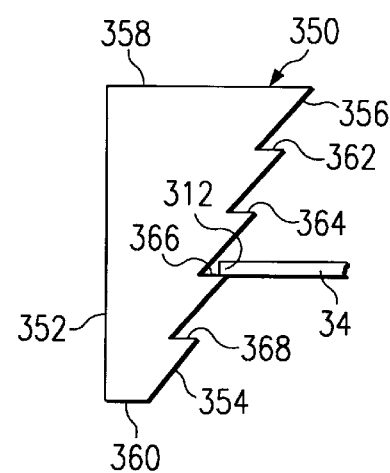
FIG. 25 is a vertical cross-sectional view of the ring taken along line 25—25 in FIG. 24.

With reference now to FIGS. 24 and 25, a ring 350 is illustrated which is used to fit the salt grid 34 in a brine tank. The ring is split therethrough at split 380 similar to a piston ring to allow the outer circumference of the ring to vary somewhat. The ring is made of a material which provides some flexibility, such as neoprene. The brine tanks in service rarely are perfectly round. Therefore, if the salt grid is formed as a circle, there will often be gaps between the edge 312 of the salt grid and the inner wall of the brine tank due to this irregularity, allowing salt to fall through these gaps. The ring 350 is designed to accommodate this variation in brine tank wall dimensions. The ring 350 has an outer surface 352 which engages the inner wall of the brine tank. The ring 350 has an inner surface 354 which is formed in a series of cut back steps 356 which causes the top surface 358 of the ring to be much larger than the bottom surface 360. These steps 356 form a series of ledges 362, 364, 366 and 368 which can each support the edge 312 of the salt grid 34 depending upon the size of the gap between the edge of the salt grid and the interior surface of the brine tank.

During installation, the ring 350 is wrapped or fit about the edge of the salt grid so that the edge rests on one of the ledges 362–368. An effort is then made to place the ring 350 and salt grid 34 within the brine tank. If the fit is too tight, the ring is repositioned on the salt grid on a lower ledge until the ring 350 and salt grid 34 fit properly in the brine tank. If there is too much of a gap still between the outer surface 352 of the ring 350 and the inner wall of the brine tank, the ring 350 is repositioned on the salt grid with the edge of the salt grid at a higher ledge. When the ring 350 is properly positioned on the salt grid 34, there should be a snug fit between the salt grid, ring 350 and inner surface of the brine tank which prevents salt on the salt grid from inadvertently falling between the edge of the salt grid and the inner surface of the brine tank, as well as acting to true the diameter of the brine tank to some extent.

Ring 350 can also be made of PVC or ABS plastic. However, other materials can be used, including, but not limited to, acrylics, plexiglass, fiberglass, polyethylene, polypropylene, polycarbonate, NORYL®, KEVLAR® and metal structures made impervious to the brine solution by resin or asphalt type coatings.

Although several embodiments of the invention have been illustrated in the accompanying drawings and described in the foregoing detailed description, it will be understood that the invention is not limited to the embodiments disclosed, but is capable of numerous rearrangements, modifications and substitutions of parts and elements without departing from the spirit and scope of the invention.

What is claimed is:

1. An apparatus, comprising:
    a brine tank having an interior, an inner surface and a nominal inner diameter;
    a salt grid; and
    a ring having an outer surface engaging the inner surface of the brine tank and an inner surface formed by a series of cut back steps, the salt grid having an edge engaging a step on the ring selected so that the salt grid and ring fit tightly within the interior of the brine tank.
2. The apparatus of claim 1 wherein the ring is neoprene.
3. The apparatus of claim 1 wherein the ring is split.
4. The apparatus of claim 1 wherein the salt grid is ABS plastic.
5. The apparatus of claim 1 in the ring has a center, each of said cut back steps of said series of cut back steps being a different radial distance from the center.
6. A spacing apparatus for fitting a salt grid within the interior of a brine tank, the brine tank having an inner surface and a nominal inner diameter, comprising:
    a ring having an outer surface engaging an inner surface of a brine tank and an inner surface formed by a series of cut back steps, a salt grid having an edge engaging a step on the ring selected so that the salt grid and ring fit tightly within the interior of the brine tank.
7. The apparatus of claim 6 wherein the ring is neoprene.
8. The apparatus of claim 6 wherein the ring is split.
9. The apparatus of claim 6 wherein the salt grid is ABS plastic.
10. The spacing apparatus of claim 6 wherein the ring has a center, each of said cut back steps at a different radial distance from the center.
11. A method for fitting a salt grid within the interior of a brine tank, the brine tank having an inner surface and a nominal inner diameter, comprising the steps of:
    fitting a ring having an outer surface and an inner surface formed by a series of cut back steps about an edge of a salt grid so that the edge of the salt grid rests on a ledge formed between an adjacent pair of said steps; and
    placing the ring and salt grid within the brine tank to determine if the ring and salt grid are a snug fit in the brine tank.
12. The method of claim 11 further comprising the step of repeating the step of fitting the ring on the salt grid at a different ledge between an adjacent pair of said steps and placing the ring and salt grid within the brine tank until the ring and salt grid are a snug fit within the brine tank.
13. The method of claim 11 further comprising the step of expanding the ring at a split therein to fit the ring over the edge of the salt grid.

* * * * *